United States Patent
Trachtman et al.

(10) Patent No.: US 10,747,635 B1
(45) Date of Patent: Aug. 18, 2020

(54) ESTABLISHING QUORUMS ON AN OBJECT-BY-OBJECT BASIS WITHIN A MANAGEMENT SYSTEM

(71) Applicant: EMC IP Holding Company LLC, Hopkinton, MA (US)

(72) Inventors: Michael Trachtman, Arlington, MA (US); Salvatore DeSimone, Woodbury, CT (US); Bradford B. Glade, Harvard, MA (US); Sumeet K. Malhotra, Bangalore (IN); Eugene Ortenberg, Falls Church, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 88 days.

(21) Appl. No.: 14/586,423

(22) Filed: Dec. 30, 2014

(51) Int. Cl.
| | |
|---|---|
| *G06F 11/30* | (2006.01) |
| *G06F 11/20* | (2006.01) |
| *G06F 11/14* | (2006.01) |
| *G06F 11/07* | (2006.01) |

(52) U.S. Cl.
CPC ...... *G06F 11/3006* (2013.01); *G06F 11/0709* (2013.01); *G06F 11/14* (2013.01); *G06F 11/2007* (2013.01); *G06F 11/3048* (2013.01); *G06F 11/3055* (2013.01); *G06F 2201/85* (2013.01)

(58) Field of Classification Search
CPC .. G06F 11/2007; G06F 11/0709; G06F 11/14; G06F 11/3048; G06F 11/3055; G06F 11/3006
See application file for complete search history.

(56) References Cited

U.S. PATENT DOCUMENTS

| | | | |
|---|---|---|---|
| 7,054,883 B2 | 5/2006 | Meiri et al. | |
| 7,320,083 B2* | 1/2008 | Davies | G06F 11/1456 714/3 |
| 7,475,207 B2 | 1/2009 | Bromling et al. | |

(Continued)

OTHER PUBLICATIONS

"Billiard Quorums on the Grid" by Agrawal et al, Department of Computer Science, University of California, Santa Barbara, available as of the date of this filing at http://www.cs.ucsb.edu/~omer/DOWNLOADABLE/billiard97.pdf, the entire contents of which is hereby incorporated by reference.

(Continued)

*Primary Examiner* — Paul Contino
(74) *Attorney, Agent, or Firm* — Krishnendu Gupta; Anne-Marie Dinius

(57) ABSTRACT

Techniques and mechanisms for establishing quorums on an object-by-object basis; e.g., by associating quorum schemes, quorum-eligibility groups and/or quorum rules with objects on an object-by-object basis. For example, a certain quorum scheme may be associated with one object in a system and a different quorum scheme may be associated with another object in the system. A management system may be configured to be part of a quorum-eligibility group of an object based on any of a variety of factors, including any of: the number of management systems in the system, the quorum rule to be employed; whether an instance of the object is stored in a same fault domain of at least one of the management systems that are members of the quorum scheme; and the desire to maintain high availability of the object in response to various failure scenarios.

20 Claims, 10 Drawing Sheets

(56) References Cited

U.S. PATENT DOCUMENTS

| | | | |
|---|---|---|---|
| 8,578,204 B1 | 11/2013 | Ortenberg et al. | |
| 8,667,490 B1 | 3/2014 | Van Der Goot | |
| 8,782,242 B2* | 7/2014 | Ahmad | G06F 9/5033 |
| | | | 709/226 |
| 8,874,954 B1* | 10/2014 | Gupte | G06F 11/2028 |
| | | | 714/1 |
| 9,098,392 B1* | 8/2015 | Gadiraju | G06F 11/2023 |
| 9,489,434 B1* | 11/2016 | Rath | G06F 17/30557 |
| 10,127,123 B2* | 11/2018 | Helmick | G06F 11/00 |
| 2008/0134178 A1* | 6/2008 | Fitzgerald | G06F 9/45537 |
| | | | 718/1 |
| 2010/0107015 A1* | 4/2010 | Bernabeu-Auban | |
| | | | G06F 11/008 |
| | | | 714/38.14 |
| 2013/0080559 A1* | 3/2013 | Rao | H04L 67/1097 |
| | | | 709/208 |
| 2013/0097319 A1* | 4/2013 | Ahmad | G06F 9/5033 |
| | | | 709/226 |
| 2013/0290295 A1* | 10/2013 | Soules | G06F 17/30289 |
| | | | 707/714 |
| 2014/0059380 A1* | 2/2014 | Krishnan | G06F 11/1415 |
| | | | 714/15 |
| 2014/0059392 A1* | 2/2014 | Ren | G06F 11/301 |
| | | | 714/47.1 |
| 2015/0082302 A1* | 3/2015 | Cheng | G06F 9/45533 |
| | | | 718/1 |
| 2018/0262563 A1* | 9/2018 | Mohammed | H04L 67/1031 |

OTHER PUBLICATIONS

U.S. Appl. No. 12/932,080, filed Feb. 17, 2011, Meiri et al.
U.S. Appl. No. 13/631,030, filed Sep. 28, 2012, DeSimone et al.

* cited by examiner

ESTABLISHING QUORUMS ON AN OBJECT-BY-OBJECT BASIS WITHIN A MANAGEMENT SYSTEM

BACKGROUND

Many computer systems include objects and systems that manage these objects. As used herein, a system that manages an object is referred to herein as a "management system." As used herein, an "object" is a software abstraction representing a thing (i.e., item). An object may be any type of thing managed by a computer, including but not limited to a: physical item, virtual item, communication item, computation item, physical or logical device, machine, printer, weapon, equipment, data storage item, another object, a group of objects, or any suitable combination of the foregoing. A "data storage item" or "data storage object" may be any type of physical or logical item related to data storage, including, but not limited to, data, meta data, physical storage device, logical storage device (e.g., a thin device), storage array, logical storage unit, logical volume, solid state (e.g., flash) drive, disk drive, disk segment, disk track, cache, storage group, consistency group, file, block, superblock, extent, sub-extent, service provider, model, port, front-end adapter, back-end (e.g., disk) adapter, other storage object, a group of any of the foregoing, or any suitable combination of the foregoing.

In some cases, multiple management systems manage the same object, and such management systems may be logically and/or physically coupled to each other such that the multiple management systems manage the object in a coordinated manner. If a communication failure occurs between one or more of the multiple management systems, problems may arise in the management systems managing the object in a coordinated manner.

SUMMARY

This Summary provides an illustrative context for aspects of the invention, in a simplified form. It is not intended to be used to determine the scope of the claimed subject matter. Aspects of the invention are described more fully below in the Detailed Description.

In some embodiments of the invention, a system includes a plurality of objects residing in a plurality of fault domains, and a plurality of management systems operative to manage the plurality of objects. A first of the plurality of fault domains has a first object and a second object of the plurality of objects resident therein. A first quorum scheme abstraction is provided, the first quorum scheme abstraction defining a first quorum scheme having a first quorum-eligibility group of management systems eligible to manage one or more of the plurality of objects. A second quorum scheme abstraction is provided, the second quorum scheme defining a second quorum scheme having a second quorum-eligibility group, different from the first quorum-eligibility group, of management systems eligible to manage one or more of the plurality of objects. At least a first of the plurality of management systems is configured to: associate the first quorum scheme with the first object; and associate the second quorum scheme with the second object.

In some embodiments of the invention, a system is configured with logic to perform one or more of the foregoing acts. Such logic may be embodied in one or more discrete modules of the system.

In some embodiments of the invention, a computer-readable storage device is provided, encoded with computer-executable instructions that, as a result of being executed by a computer, control the computer to perform one or more of the foregoing acts.

Other advantages, novel features, and objects of the invention, and aspects and embodiments thereof, will become apparent from the following detailed description of the invention, including aspects and embodiments thereof, when considered in conjunction with the accompanying drawings, which are schematic and are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
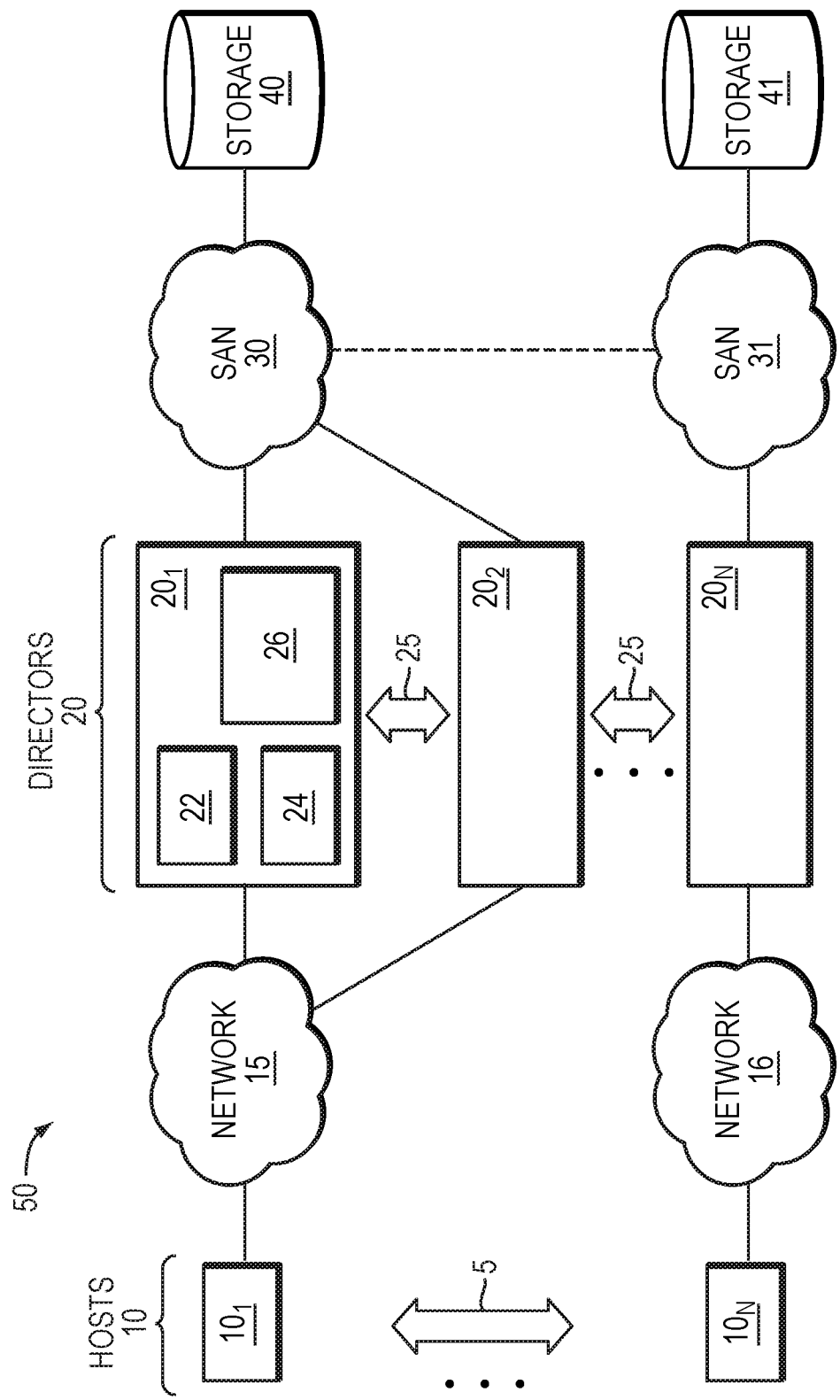
FIG. 1 is a schematic illustration of an embodiment of a network configuration of a distributed storage system that may be used in accordance with some embodiments of the invention.

Defined herein are techniques and mechanisms for establishing quorums on an object-by-object basis; e.g., by associating quorum schemes, quorum-eligibility groups and/or quorum rules with objects on an object-by-object basis. For example, a certain quorum scheme may be applied to one object in a system, and a different quorum scheme may be applied to another object in the system. In some cases, the different objects may be stored within a same data storage system or component thereof.

As used herein, a "quorum" is a group of management systems, which also may include one or more NQMs (described below), for which, during a certain temporal interval, the management systems of such group are allowed to manage a particular object. As used herein, a "quorum rule" is a rule defining, for a given object, what constitutes a quorum for the quorum-eligibility group during a certain temporal interval. In some embodiments, a quorum rule defines the number of members of a quorum-eligibility group that must be in operative communication with each other to establish a quorum, thus allowing any management systems of such number to manage the object. In some embodiments, a quorum is (e.g., is defined by a quorum rule to be) a majority of the members of a quorum-eligibility group. It should be appreciated that, while various embodiments of the invention are described herein with majority as the quorum type, the invention is not so limited. Other types of quorum schemes and quorum rules may be used, and are intended to fall within the scope of the invention, for example, any of those described in, or referenced by "Billiard Quorums on the Grid" by Agrawal et al, Department of Computer Science, University of California, Santa Barbara, available as of the date of this filing at www.cs.ucsb.edu, the entire contents of which is hereby incorporated by reference.

As used herein, a "quorum-eligibility group" is, for a given object, a group of management systems and optionally one or more NQMs that are eligible for consideration in establishing a quorum to manage the object. The members of a quorum-eligibility group are management systems, and optionally one or more NQMs, and each member of the quorum-eligibility group may be considered "quorum-eligible" for the object corresponding to the quorum-eligibility group. As will be explained in more detail below, for an object within a system, there may be one or more management systems that are quorum-eligible for the object, and one or more management systems that are "quorum-ineligible"—meaning that they are not members of the quorum-eligibility group for the object.

As used herein, a "quorum scheme" of an object is a combination of the quorum-eligibility group and the quorum rule(s) defined for the object. Two objects may have different quorum schemes if either their quorum-eligibility group or their quorum rules are different.

In some embodiments of the invention, one or more quorum schemes may be defined. For example, one or more quorum scheme abstractions (e.g., in software) may be provided (e.g., created and/or modified) by a user (e.g., a system administrator), each quorum scheme abstraction defining a quorum scheme. In some embodiments of the invention, a quorum scheme abstraction does not explicitly define a quorum rule for a quorum scheme, for example, if a default quorum rule (e.g., majority) is defined for, and applied, to all quorum schemes. In such embodiments, the quorum scheme is defined without a quorum rule. One or more quorum scheme abstractions may be maintained as part of a data structure, as described below in more detail. Each quorum scheme may be associated with one or more objects. For example, a data structure representing the object may reference (e.g., index) the respective quorum scheme abstraction. It should be appreciated that, alternatively, quorum schemes may be defined on an object-by-object basis; that is, each object may have its own quorum scheme defined. For example, a single abstraction may define a quorum scheme for a specific object. Such a quorum scheme may be unique to that object, or associated with other objects as well. Further, such a quorum scheme may not have a quorum rule specified, for example, if a default quorum rule (e.g., majority) is defined for, and applied, to all quorum schemes.

It should be appreciated that defining a quorum scheme and associating it with an object are not necessarily separate discrete acts, but rather may be considered part of a single act. For example, defining a quorum scheme (e.g., by creating a quorum scheme abstraction) may include associating the quorum scheme with an object; and defining an object (e.g., creating a software abstraction defining the object) may include associating the object with a quorum scheme.

In some embodiments of the invention, associating a quorum scheme with an object (e.g., by a user) may take into consideration whether an instance of the object is stored in a same fault domain (e.g., site) of at least one of the management systems that are members of the quorum scheme (i.e., members of the quorum-eligibility group of the quorum scheme). That is, whether an instance of an object is in a same default domain as at least one management system of a quorum scheme will be a factor in determining whether such quorum scheme is associated with the object, as will be described below in more detail.

In some embodiments, associating a quorum scheme with an object may take into consideration whether the candidate management systems actually has interest in the object. That is, when associating quorum schemes with an object, it may be taken into consideration whether the one or more (e.g., all) of the quorum scheme members have (or will have) interest in managing the object. For example, it may be desirable to associate the object only with a quorum scheme for which all members have interest in managing the object.

In some embodiments, not all management systems that have access to, and the ability to manage, an object—even those in a same fault domain—will be members of a quorum-eligibility group (of the quorum scheme) associated with the object. A used herein, a management server that has access to and is capable of managing an object is "management-capable" with respect to the object. As will be described in more detail below, including less than all management-capable management systems of an object—even those in same fault domain—in the quorum scheme associated with the object may be desirable for maintaining high availability of the object in response to various failure scenarios.

As will be explained in more detail below, in addition to management systems, a quorum-eligibility group also may include a non-management system, referred to herein as a "non-managing quorum-eligibility group member" or "NQM." NQMs may be used to help establish a quorum, as will be described in more detail below.

As used herein, a "quorum member" is a member of a quorum-eligibility group that currently is part of the quorum for the corresponding object. In some embodiments, during normal operation, when all members of a quorum-eligibility group are in operative communication with all other members of the quorum-eligibility group, all members of the quorum-eligibility group are quorum members—i.e., part of the quorum. In some embodiments, a quorum of a quorum-eligibility group may be determined periodically, and/or in response to an event, for example, in response to a communication failure between two or more components of the systems, for example, between two or more management systems of a system, or between a management system and one of the objects being managed. In some embodiments of the invention, when a quorum is determined in response to such a communication failure, the determined quorum includes less than all members of the quorum-eligibility group.

It should be appreciated that a communication failure between any two components of a system may result from any of a variety of types of failure, for example, a failure or crash of: one of the management systems, a storage resource on which an object resides, an entire fault domain; a network communication connection (e.g., link or channel) between two or more system components or management systems; the entire network between two or more management systems; or any combination of the foregoing. That is, in the context of this specification, from the perspective of a management system, any of the foregoing failures is considered a communication failure, regardless of the cause. Quorums may be desirable to provide coordinated management of managed objects, in particular when there is uncertainty about of the type of the communication failure and what communication channels remain open between management systems and/or the objects being managed.

As used herein, a "fault domain" is a discrete logical or physical partition of a system in which the components thereof share at least one single point of failure, for example a group of components dependent on a same power source, cooling source or network connection point. Fault domains may include, for example, a machine component, machine, appliance, logical area network (LAN), wide area network (WAN), storage area network (SAN), power sources, cooling sources, other type of network, room, floor, building, data center, office park, campus, premise, site, district, town, city, state, region, country, continent, other types of partitions, or any suitable combination of the foregoing. It should be appreciated that the type and number of fault domains for a system may vary depending on the type and function of a system, as well as the type and specifics of communication failures of interest.

In order to provide high availability within a data storage system, objects and the management systems that manage them may be distributed across multiple fault domains (e.g., sites) so that, in the event of a failure (e.g., power outage or disaster) of a particular fault domain, the data can still be accessed and managed from another fault domain. In some embodiments, to assist in establishing a quorum, one or more NQM(s) may be configured within a particular fault domain of the system, for example, a fault domain in which no management systems of the system (or of a particular quorum-eligibility group) reside.

As used herein, a "site" is a fault domain associated with a particular geographical location, e.g., an organization's building, premise or campus, which may be referenced by a geo-political name—e.g., the Boston site, Manhattan building or Seattle campus. It should be appreciated that, while various embodiments of the invention are described herein with respect to a site as the fault domain type, the invention is not so limited. Other types of fault domains may be used, and are intended to fall within the scope of the invention.

A "partition scenario" occurs for an object when a communication failure occurs between two or more management systems that are providing coordinated management of the object. A "split brain scenario" occurs when, as a result of a partition scenario, two or more of the management systems continue to try to manage the object in an uncoordinated, independent manner. Such uncoordinated, independent management could result in inconsistent management of objects. In a data storage system, such inconsistent management could result in loss or corruption of data (e.g., a customer's data). Quorums may be used to avoid split-brain scenarios. That is, split brain scenarios can be avoided by allowing only members of the quorum (who by definition are in operative communication with one another) to manage the object during a partition scenario.

In some embodiments, a system includes multiple fault domains, and an object exists (e.g., has an instance) in only a subset (e.g., one) of those fault domains. In such embodiments, a quorum-eligibility group may be defined (and one of more management systems of the system configured) such that a number of quorum-eligibility group members (e.g., management systems and optionally one or more NQMs) that reside in the subset of fault domains is greater than a total combined number of quorum-eligibility group members that reside in any other of the fault domains (i.e., that are not part of the subset). Further, in such embodiments, a quorum-eligibility group for the object may be defined (and one of more management systems of the system configured) to include an odd number of management systems of the system, for example, if the object exists only in a single fault domain. Further, a quorum-eligibility group for the object may be defined (and one or more management systems of the system configured) such that a same number of members of the quorum-eligibility group reside in each fault domain of such subset. Such definitions and configurations may be desirable when majority is the type of quorum rule. Other definitions and configurations of quorum-eligibility groups may be employed, for example, when other types of quorum rules are used.

In any of the embodiments of the invention described herein, one or more management systems may be, include or be part of: an EMC® VPLEX® system available from EMC (e.g., VPLEX® Local, VPLEX® Metro™ or VPLEX® Geo), an EMC® ViPR® system available from EMC or a suitable combination thereof. Further, an NQM (e.g., NQM 712) may be implemented as part of a Witness component of such VPLEX system. A VPLEX Witness may be implemented as described in U.S. Pat. No. 8,578,204, issued Nov. 5, 2013, titled "Witness Facility for Distributed Storage System," by Ortenberg et al, the contents of which are hereby incorporated by reference, and may be modified to assist in handling quorums on an object-by-object basis, as opposed to, for example, a site-by-site basis. An EMC ViPR system may be implemented using one or more of the techniques or mechanisms described in U.S. patent Ser. No. 13/631,030, titled "Method and Apparatus for Federating a Plurality of One Big Arrays" by DeSimone et al., filed Sep. 28, 2012, the entire contents of which are hereby incorporated by reference. Other management systems may be used.

Examples

FIG. 1 is a schematic illustration of an embodiment of a network configuration of a distributed storage system 50 that may be used in accordance with some embodiments of the invention. It should be appreciated that system 50 is provided for illustrative purposes. While various embodiments of the invention are described in relation to system 50, the invention is not so limited. Embodiments of the invention may be implemented on other types of systems, storage systems and/or distributed storage systems, which are intended to fall within the scope of the invention.

A plurality of host devices 10 ($10_1$ to $10_N$) may be communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. In general, "N" is used herein to indicate an indefinite plurality, so that the number "N" when referred to one component does not necessarily equal the number "N" of a different component. For example, the number of hosts 10 may or may not equal the number of directors 20 in FIG. 1. Cache memory may generally be considered memory that is faster and more easily accessible by a processor than other non-cache memory used by a device.

Each of the hosts 10 may be communicably coupled to one or more of directors 20 over one or more networks 15, 16. It is noted that host devices 10 may be operatively coupled with directors 20 over any of a number of connection schemes over the one or more networks 15, 16, as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites may be geographically distant from one another. It is also noted that in various embodiments the networks 15, 16 may be combined with the SAN networks 30, 31.

Each of the directors 20 may also include, or be communicably coupled with, one or more file systems, such as a virtual machine file system (VMFS), a new technology file system (NTFS) and/or other appropriate file system, and may be communicably coupled with one or multiple storage objects 40, 41, each including one or more disk drives and/or other storage volumes, over one or more storage area networks (SAN) 30, 31, and/or other appropriate network, such as a LAN, WAN, etc. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites may be geographically distant from one another. The system described herein may be used in connection with a VPLEX or ViPR product produced by EMC Corporation of Hopkinton, Mass. and/or a vSphere product produced by VMware Inc. of Palo Alto, Calif. The system described herein may also be used in connection with a storage product produced by EMC Corporation, such as, for example, a Symmetrix®, VMAX® or VNX® product. Although principally discussed and illustrated in connection with embodiments for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31 that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous read & write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

As discussed in detail elsewhere herein, in a virtualized environment, a virtual center, an example of which may be a vCenter product produced by VMware, Inc. of Palo Alto, Calif., may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Unified Infrastructure Manager (UIM) may be integrated with Vblock and provide a management console for management of the Vblock package.

Figure 2:
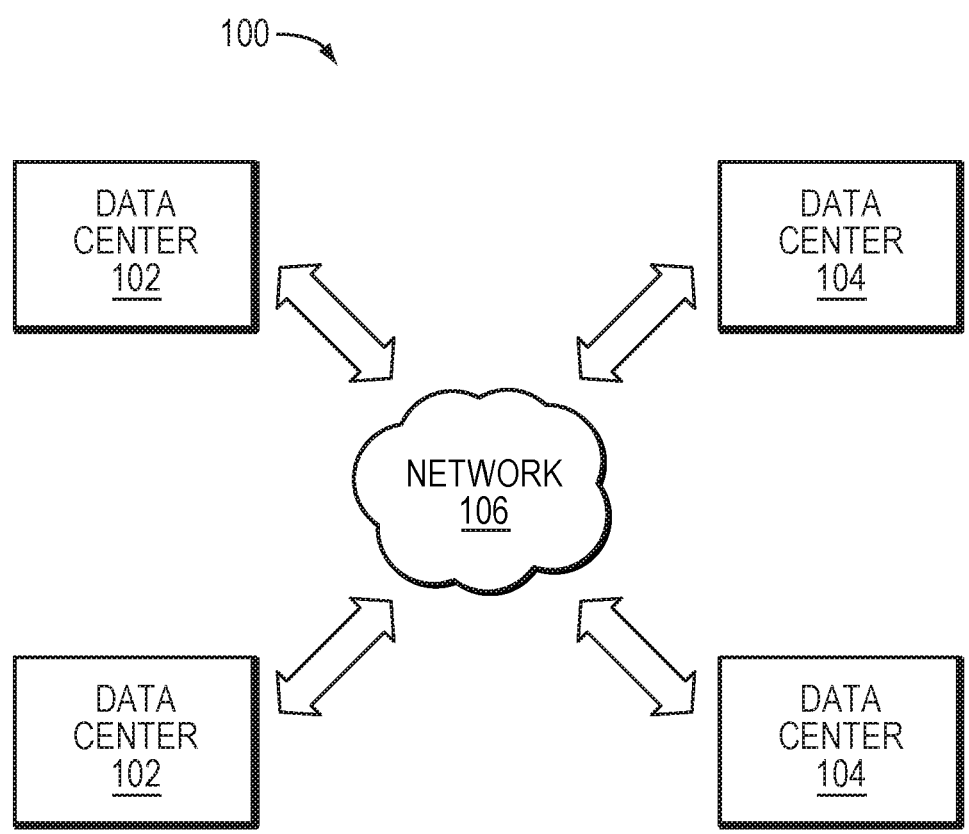
FIG. 2 is a schematic illustration of an embodiment of a system that includes a plurality of data centers in communication via a network that may be used in accordance with some embodiments of the invention.

FIG. 2 is a schematic illustration of an embodiment of a system 100 that includes a plurality of data centers in communication via a network that may be used in accordance with some embodiments of the invention. It should be appreciated that system 100 is provided for illustrative purposes. While various embodiments of the invention are described in relation to system 100, the invention is not so limited. Embodiments of the invention may be implemented on other types of systems, storage systems and/or distributed storage systems, which are intended to fall within the scope of the invention.

System 100 may include a first data center 102 in communication with a second data center 104 via a network 106. Although the following embodiments are discussed principally in connection with data centers 102, 104, any number of additional data centers, represented as data centers 102', 104', may be also be used in connection with the system described herein. Each of the data centers 102, 104 may include a plurality of storage devices and processors (not shown in FIG. 2) for executing applications (e.g., using a plurality of VMs) and which may be controlled and/or managed in connection with one or more virtual centers and virtual data centers. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that may be configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons. For a discussion of migrating VMs, reference is made to U.S. patent application Ser. No. 12/932,080 to Meiri et al., filed Feb. 17, 2011, entitled "VM Mobility Over Distance," and U.S. patent application Ser. No. 13/136,359 to Van Der Goot, filed Jul. 29, 2011, entitled "Active/Active Storage and Virtual Machine Mobility Over Asynchronous Distances," which are incorporated herein by reference. A product, such as EMC's VPLEX Metro and/or VPLEX Geo, may be used to enable the objects of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with the ability to non-disruptively move many VMs. It is noted that the term "VPLEX" used herein may also generally be understood to refer to and include any appropriate software and/or component packages that provide for coordinating and/or federating objects of disparate systems as a single pool of virtual objects, in particular, for example, a single pool of virtual storage.

Figure 3:
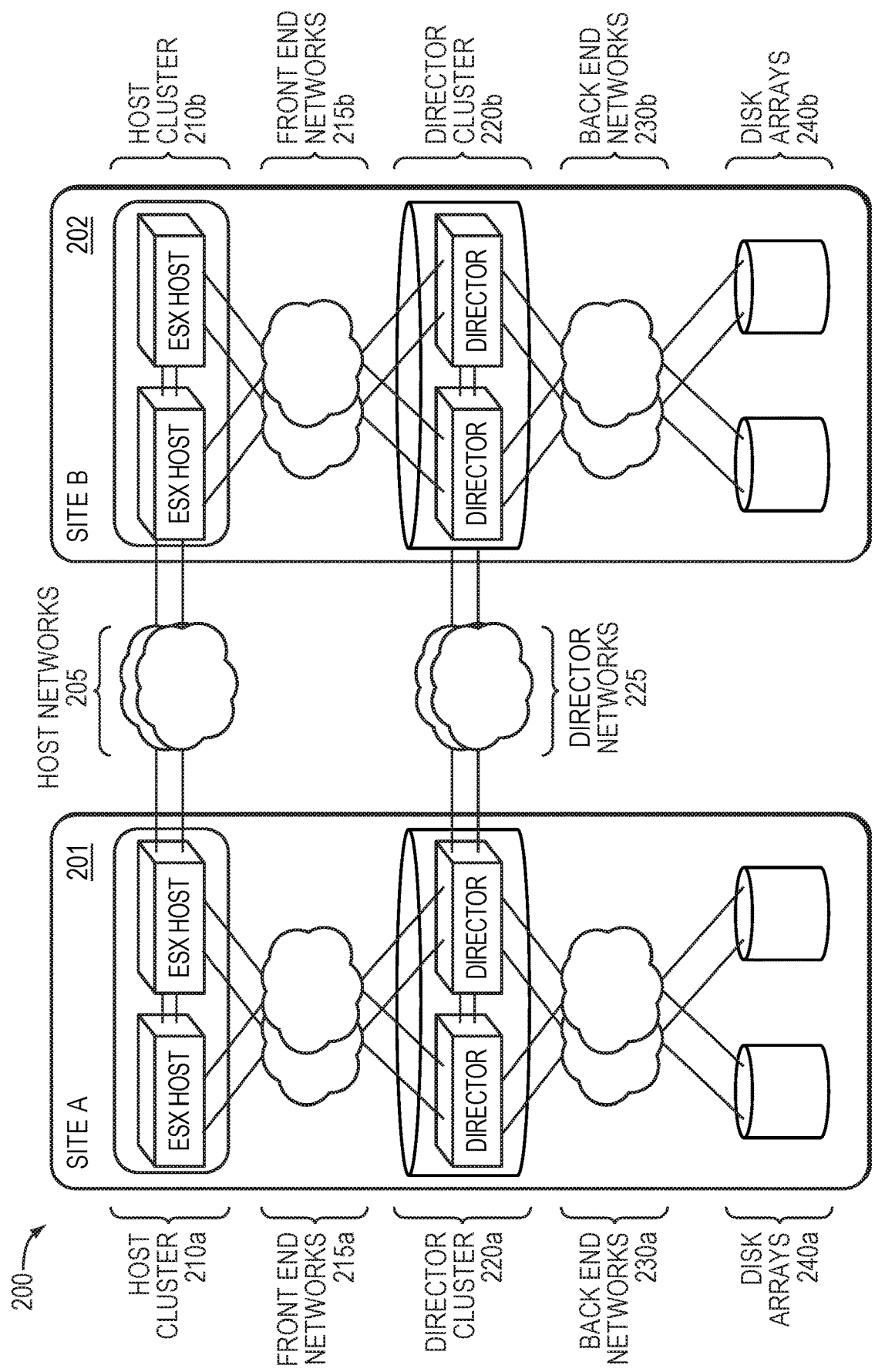
FIG. 3 is a schematic illustration showing a distributed storage system with multiple sites according to an embodiment of the invention.

FIG. 3 is a schematic illustration showing a distributed storage system 200 with multiple sites according to an embodiment of the invention. It should be appreciated that system 200 is provided for illustrative purposes. While various embodiments of the invention are described in relation to system 200, the invention is not so limited. Embodiments of the invention may be implemented on other types of systems, storage systems and/or distributed storage systems, which are intended to fall within the scope of the invention. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts grouped in host clusters 210a,b, one or more directors grouped in director clusters 220a,b, and disk arrays 240a,b. Each host cluster 210a,b and director cluster 220a,b may each include software and/or other controllers or interfaces to control or administer operations in connection with described functions of the hosts and directors. In an embodiment, each host cluster 210a,b may include hosts, such as ESX hosts, in a vSphere cluster and each director cluster 220a,b may include directors in a VPLEX cluster. It is noted that although ESX hosts and illustrated and discussed herein as examples, any appropriate host may be used in connection with the system described herein. Front end networks 215a,b may connect through host links to the host clusters 210a,b and through front end links to the director clusters 220a,b. One or more back end networks 230a,b may connect through back end links to the director clusters 220a,b and through array links to the disk arrays 240a,b. In an embodiment, the front and back end networks may be Fibre Channel networks. The front end networks 215a,b allow the hosts (or VMs running therein) to perform I/O operations with the host clusters 210a,b, while the back end networks 230a,b allow the directors of the director clusters 220a,b to perform I/O on the disk arrays 240a,b. One or more host networks 205, such as vSphere Ethernet networks, connect the ESX hosts in host clusters 210a,b. One or more director networks 225 connect the directors of the director clusters 220a,b.

Various types of failures, including network failures within a cluster, may result in behaviors that are further discussed elsewhere herein. It should be noted that the host cluster 210a,b (e.g., vSphere cluster) may be connected in such a way that VMs can keep their network (e.g., IP, FC, IB) addresses when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous latency. For asynchronous operation, a write operation to cluster at a remote site may be acknowledged as soon as a protection copy is made within the cluster. Sometime later the write data is synchronized to the remote site. Similarly, writes to the remote site may be later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the dirty data between the clusters.

The above operations may work as long as the inter-cluster network is available. If the inter-cluster link fails, both clusters may contain dirty data that is unknown by the respective remote clusters. As a consequence of this failure, the director cluster may roll-back the image of the data to a write order consistent point. In other words, the director cluster may roll-back the image of the data to a point where it knows the data that is available on both clusters, or to a time where the write data was exchanged between both sites. The director cluster may also guarantee roll-back to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. Known techniques may provide write order consistency by grouping writes in what are called deltas and providing the consistency on a delta boundary basis. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference.

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be referred to herein as "vMotion" and may be facilitated by a VMware's vMotion® product. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. patent application Ser. No. 13/136,359 to Van Der Goot, filed Jul. 29, 2011, entitled "Active/Active Storage and Virtual Machine Mobility Over Asynchronous Distances," which is incorporated herein by reference.

Figure 4:
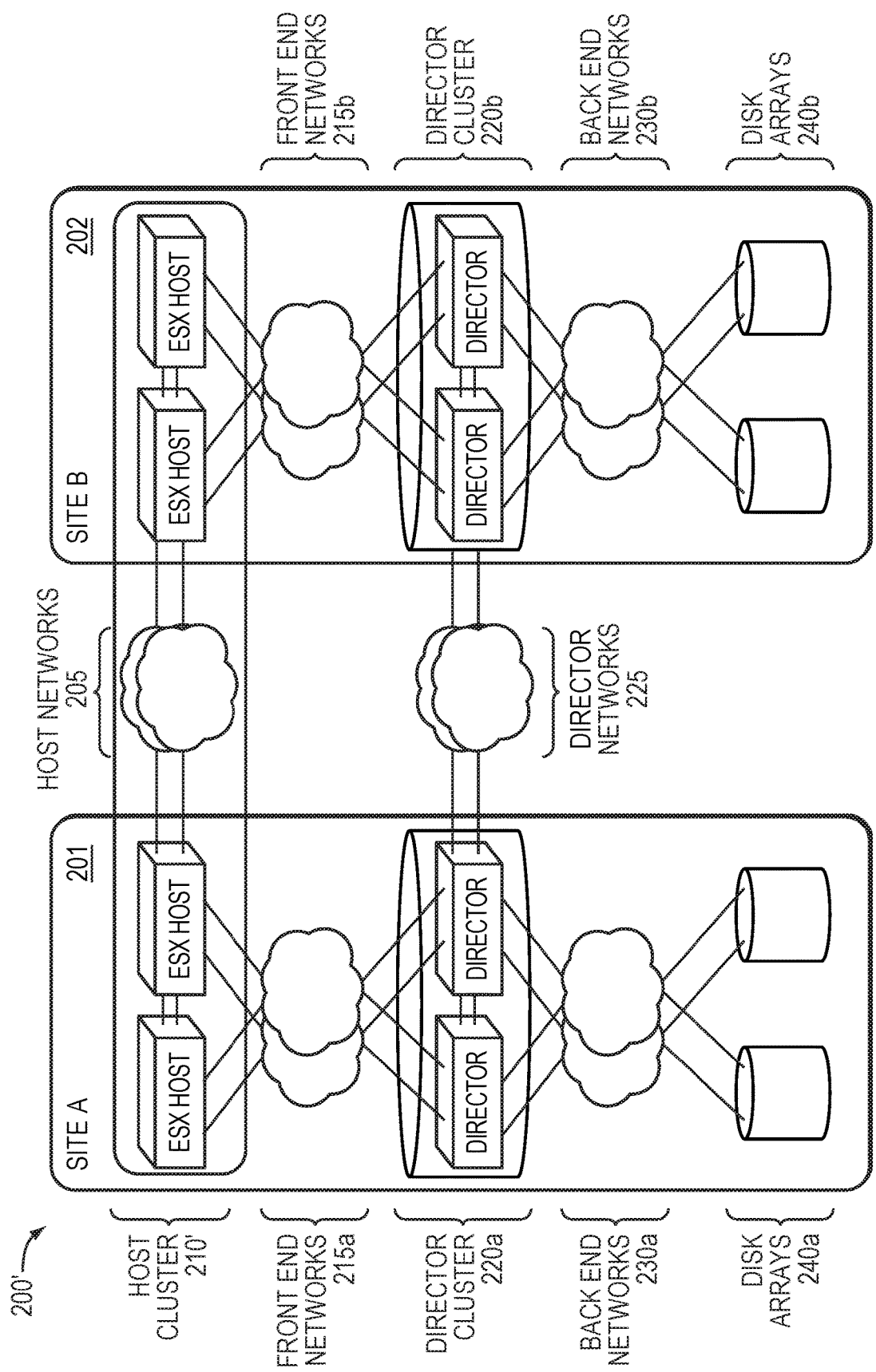
FIG. 4 is a schematic illustration of an embodiment of a configuration of a distributed storage systems that may be used in accordance with some embodiments of the invention.
Figure 5:
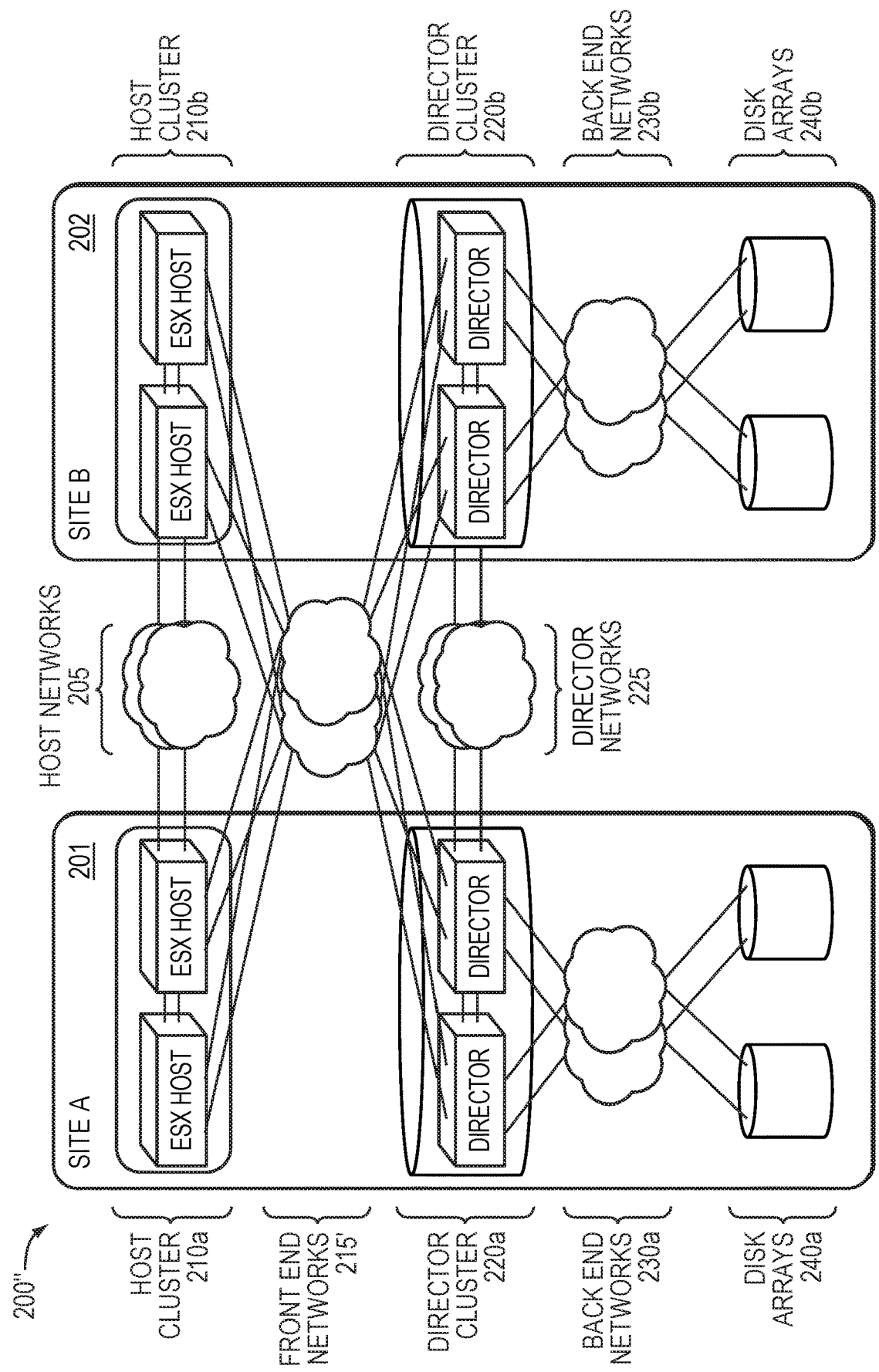
FIG. 5 is a schematic illustration of an embodiment of a configuration of a distributed storage systems that may be used in accordance with some embodiments of the invention.

FIGS. 4 and 5 are schematic illustrations of embodiments of a configuration of a distributed storage systems 200' and 200" that may be used in accordance with some embodiments of the invention. It should be appreciated that systems 200' and 200" are provided for illustrative purposes. While various embodiments of the invention are described in relation to systems 200' and 200", the invention is not so limited. Embodiments of the invention may be implemented on other types of systems, storage systems and/or distributed storage systems, which are intended to fall within the scope of the invention.

In FIG. 4, a distributed storage system 200' is shown that includes a host cluster 210' as a distributed processing layer operating across the multiple sites 201, 202 and otherwise having elements like that discussed elsewhere herein. In FIG. 5, a distributed storage system 200" is shown in which the front end networks 215' are shown operating as an external network accessed by each of the sites 201, 202 and otherwise having elements like that discussed elsewhere herein.

Figure 6:
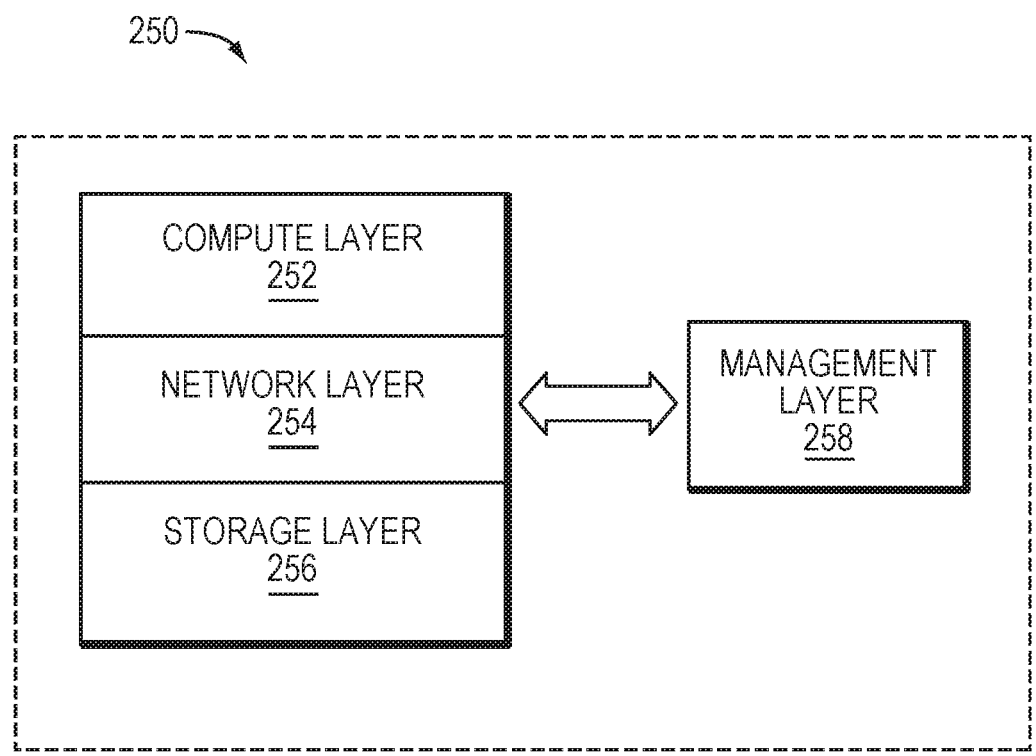
FIG. 6 is a schematic illustration of an embodiment of a cloud computing system that may be used in accordance with some embodiments of the invention.

FIG. 6 is a schematic illustration of an embodiment of a cloud computing system that may be used in accordance with some embodiments of the invention. It should be appreciated that system 250 is provided for illustrative purposes. While various embodiments of the invention are described in relation to system 250, the invention is not so limited. Embodiments of the invention may be implemented on other types of systems, computing systems and/or cloud computing systems, which are intended to fall within the scope of the invention. System 250 may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute 252 and storage 256 layers within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM).

Figure 7:
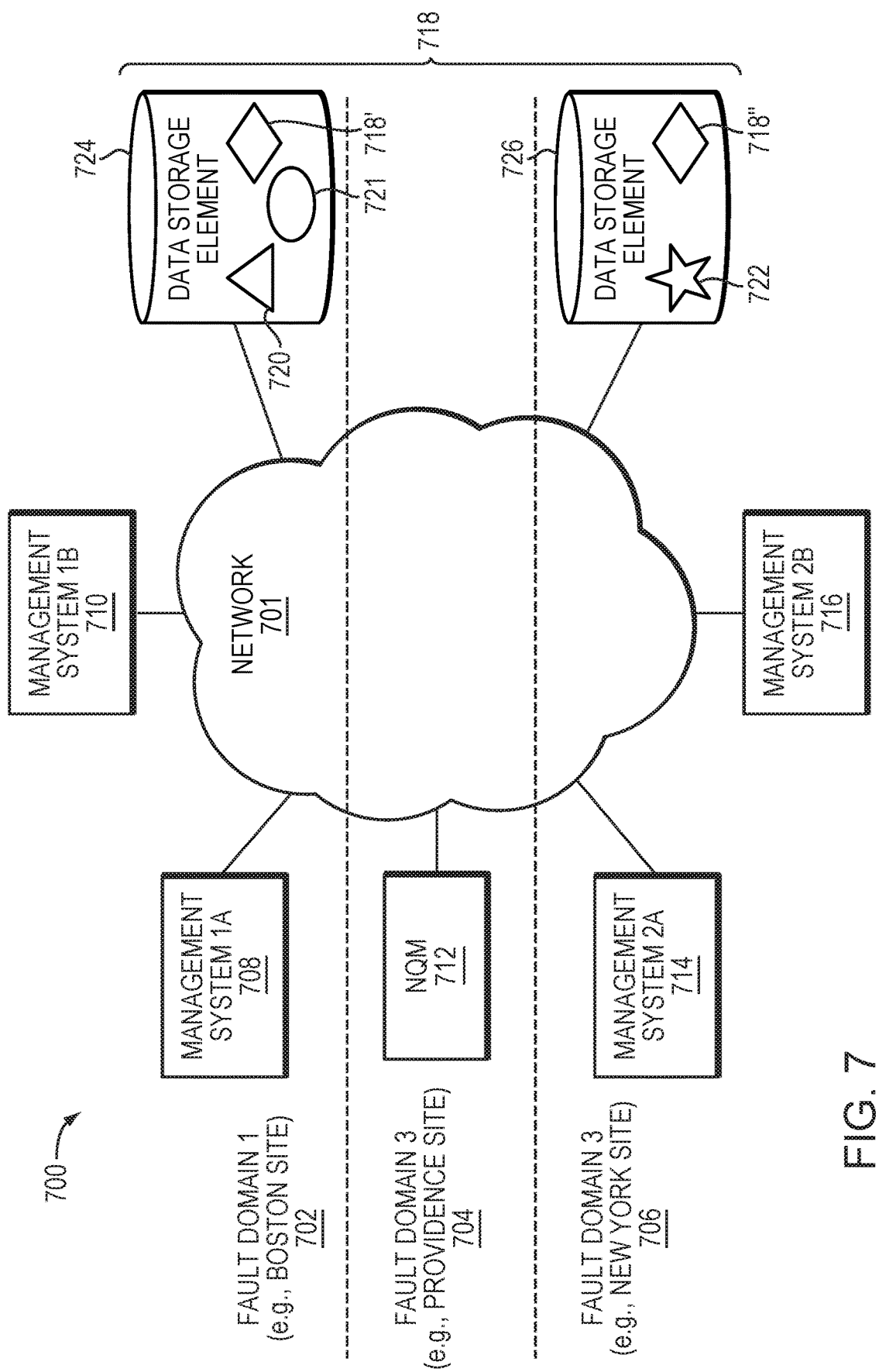
FIG. 7 is a schematic illustration of an embodiment of a system for managing a plurality of objects in accordance with some embodiments of the invention.

FIG. 7 is a schematic illustration of an embodiment of a system 700 for managing a plurality of objects in accordance with some embodiments of the invention. It should be appreciated that system 700 is provided for illustrative purposes. While various embodiments of the invention are described in relation to system 700, the invention is not so limited. Embodiments of the invention may be implemented on other types of systems, for example, variations of system 700, which are intended to fall within the scope of the invention. It should be appreciated by those of skill in the art that system 700 is merely illustrative, and typical implementations may be more complex. System 700 may be implemented as part of, or including, any of systems 50, 200, 200', 200" and/or 250 described above in relation to FIGS. 1-6, including any of the distributed and active/active storage systems disclosed in relation thereto.

System 700 may include any of: fault domains 702, 704 and 706; management systems 708, 710, 714 and 716, NQM 712, data storage elements 724 and 726, objects 718 (including object instances 718' and 718"), 720, 721 and 722; and network 701. Network 701 may be, include, be part of and/or be a combination of, any of a variety of types of network or communication media thereof that enable suitable communication of information between system 700 components 708, 710, 712, 714 and 716 and objects 718, 720, 721 and 722 of data storage elements 724 and 726, including, but not limited to: a network connection, bus, and/or other type of data link, such as a hardwire or other connections known in the art. For example, the communication media may include any of: the Internet, an intranet, a network (including a Storage Area Network (SAN)), other wireless or other hardwired connection(s), a phone line, a repeater, a multiplexer or even a satellite. For example, while not shown in FIG. 7, system 700 may include one or more switches connected between system 700 components such as, for example, a Connectrix® switch made available from EMC. Any of a variety of connection technologies may be employed to enable communications between network components across and through the communication media, including, but not limited to: Fibre Channel, SCSI, iSCSI, IP/TCP, UDP, other technologies, or any suitable combination of the foregoing.

Network 701 may employ any of a variety of configurations between network components, including management systems 708, 710, 714 and 716, NQM 712 and objects 718, 720, 721 and 722. For example, any combination of such components may have a direct connection to any other component, or one or more such components may share a connection. For example, components of a first fault domain, or a subset thereof (e.g., management systems and/or NQMs) may share a connection with components of a second domain or a subset thereof (e.g., management systems and/or NQMs of the other fault domain). Further, any component of system 700 may have a single or multiple communication links to any other component. In some embodiments, one or more connections utilize internet protocol (IP) and/or virtual private network (VPN) technologies. Each of data storage elements 724 and 726 may be, include, or be part of, any of the storage components described above in relation to FIGS. 1-6, such as for example, any of a variety of storage products offered by EMC Corporation such as, for example, a Symmetrix, VMAX or VNX product.

While FIG. 7 illustrates only a single NQM 712, it should be appreciated that the invention is not so limited. The system may include multiple NQMs, or a management system may be used instead of an NQM. It may be desirable to use one or more NQMs instead of a management system when the primary function desired is to appropriately establish quorums for an object so that the object can continue to be managed after a communication failure between management systems in a system, as opposed to the desire to provide another management system to manage the object. In some embodiments of the invention, an NQM is a Witness component of a VPLEX system.

Objects 718' and 718" represent two instances of the same object 718 that exist in different fault domains 702 and 706, e.g., stored in data storage elements 724 and 726, respectively. Objects 720 and 721 exist only in fault domain 702, e.g., stored in storage element 724, and object 722 exists in fault domain 706, e. g., stored in storage element 726.

Management systems 708, 710, 714 and 716 each may be configured to have access to, and/or manage, any of objects 718, 720 and 722. For example, in an illustrative embodiment (referred to hereinafter as the "first reference embodiment"): management systems 708 and 710 may be configured to manage object 718 by managing object instance 718'; management systems 714 and 716 may be configured to manage object 718 by managing object instance 718"; management systems 708 and 710 may be configured to access and manage objects 720, 721 and 722; management systems 714 and 716 may be configured to access (e.g., via network 700) object 720, but not to manage it; management systems 714 and 716 may be configured to not access object 721; and the quorum rule is majority.

Managing an object may include any of a variety of actions. For example, in the case of a data storage object, managing may include, but is not limited to, any of: provisioning and deprovisioning objects, changing the size of an object, mounting and unmounting objects, reserving and unreserving objects, securing, unsecuring and changing the security of objects, monitoring objects, managing power consumption, managing policies such as compression, deduping, prefetching, tiering and caching policies, managing encryption, managing event and alert notification, formatting objects, writing data, reading data, modifying data, moving data, migrating data, backing-up data, replicating data, disaster recovery, taking snapshots, analyzing data, otherwise processing data or meta-data and any suitable combination of the foregoing. It should be appreciated that, as used herein, "managing an object" includes actions typically associated with a control/management path/plane ("control plane") and actions typically associated with an I/O/data/path plane ("data plane"). In some embodiments of the inventions, the techniques and mechanisms described herein may be used on management systems exclusively in the control plane or exclusively in the data plane.

In many data storage systems, it is desirable to have high availability. "High availability" means that an object can continue to be managed even if one or more management systems and/or one or more instances of the object, fails. High availability is typically achieved through redundancy of objects and/or management systems. For example, referring to FIG. 7, in system 700, management systems 1A (708) 1B (710), 2A (714) and/or 2B (716) each may be configured to manage object 722. This system may be deemed "highly available" in that if one of these management systems fails, then the other management system can be used to manage object 722. Similarly, by storing multiple instances (718' and 718") of an object (718) in multiple fault domains, the object may still be accessed in one fault domain if the storage resource on which one of the other instances is stored fails. In many cases, two management systems managing an object (in one or multiple fault domains) need to coordinate their operations to make sure that they are not doing "contradictory things" at the same time, e.g., by exchanging communications across network 701.

The following paragraphs provide examples illustrating an evolution from a relatively simple system to a more complex system in which an object-by-object quorum scheme may be employed. It should be appreciated that the invention is not limited to any such examples or the evolution depicted.

Consider a relatively simple scenario, in which only two management systems (e.g., 708 and 714) having a single connection (i.e., communication channel or link) between them to manage all of the objects (e.g., objects 718, 720, 721 and 722) of the system in a coordinated manner, and no quorum scheme is employed. If one of the management systems (e.g., 708) fails and the other (714) learns (e.g., from an independent observer like a Witness) that it has failed, then management system 714 can still be used to manage the objects and perform needed operations. Later, when failed management system 708 comes back online, management system 714 can inform it of everything that happened while it was offline, thereby maintaining consistency between the two management systems. Unfortunately, in such a system with only one connection between the managing management systems, if the single connection fails while the management systems are still working, each of the management systems will assume that the other one has gone down, which may result in a split-brain scenario.

One potential solution to this problem is adding a second connection between the two management systems. This allows each management system (e.g., 708 or 714), in the presence of a single failure, to distinguish between the other management system having failed or one of the connections failing. However, it is still possible for both connections to fail (for example, due to a backhoe digging up cables, a natural disaster, a massive power grid failure, etc.), which may result in a split-brain scenario.

One potential solution to this potential split-brain problem is to employ a quorum scheme, for example, a quorum scheme in which the quorum-eligibility group includes an odd number of members. In various embodiments of the invention, for example, when a quorum is defined to be a majority of quorum-eligibility group members, it may be desirable to configure a quorum-eligibility group to include an odd numbers of members to ensure that a majority can be achieved. For example, in an embodiment, system 700 may include only three management systems (e.g., 708, 714 and another management entity). A single quorum scheme may be defined for the system to manage all of the objects; and thus a single quorum-eligibility group may be defined including all three of the management systems, thus resulting in an odd number of members in the quorum-eligibility group. A quorum may be defined to be a majority of quorum-eligibility group members such that, for any operation to succeed, a majority of the quorum-eligibility group members have to be in operative communication with each other and thus coordinate with each other. As used herein, a management system is in "operative communication" with another management system when it is not in communication failure with the other management system. In such systems, if a partition situation occurs, at most one subset of the quorum-eligibility group can have a quorum since there cannot be multiple majorities. The quorum rule (i.e., majority) may be applied to produce a quorum. The quorum members are allowed to manage the objects, while any management system that is not in the quorum it is not allowed to manage the object. Other quorum schemes may be used.

Such a majority-based quorum scheme prevents a split-brain scenario even if all connections between management systems fail. Because there can be only one majority, regardless of the combination of communication failures, there is never a situation in which uncoordinated management systems can simultaneously control the objects in a potentially conflicting way. In addition, any single failure still leaves at least one management system able to control the objects. A potential downside can be that there will be some situations in which no quorum can be established (e.g., no two management systems are in operative communication) and thus no management system is allowed to manage the objects, resulting in no control of the objects until the faults are corrected.

In some embodiments, a system (e.g., 700) includes multiple fault domains, for example, fault domains 702, 704 and 706, which may be, e.g., a Boston site, Providence site and a New York site, respectively. In some cases, some objects will reside in only one fault domain while other objects may have multiple instances that reside in multiple fault domains. For example, an object (e.g., 720, 721 and 722) may reside in only one fault domain, e.g., 702. In other cases, an object (e.g., 718) may have multiple instances (e.g., 718' and 718") in multiple fault domains (702 and 706, respectively). In such embodiments, at least one management system (e.g., 708, 714) in each of the fault domain (702 and 706) in which an object resides, and another management system or NQM (e.g., 712) may be provided in a third fault domain (e.g., 704). A quorum-eligibility group may be defined to include all three management entities (or if an NQM is employed, the two management systems and the NQM), and quorum may be defined by the quorum rule to be a majority (e.g., two) of the quorum-eligibility group members. Because each quorum-eligibility group member resides in a different fault domain, typically in different geographical areas, the likelihood of a situation in which no majority can be established is reduced, as it would require that communication failures occur between all three quorum-eligibility group members.

However, in a system in which only one quorum-eligibility group is defined for an entire system, another problem may arise if not all of the members of the quorum-eligibility group are configured to access and manage all objects of the system. Specifically, if a communication failure occurs on the system, and none of the resulting quorum members are configured to manage all of the objects, any objects for which such quorum members are not configured to manage will not be managed. For example, continuing with the same illustrative example, if management system 708 is the only management system configured to manage object 720, and a communication failure occurs between management system 708 and the other members of the quorum-eligibility group (e.g., 712 and 714), then object 720 will not be managed until the communication failure is rectified. What's more, even though management system 708 is the only management system configured to manage object 720 (e.g., is the only management system that is interested in the object), it cannot manage object 720 during the communication failure because it is not part of the quorum.

One potential solution to this problem is defining, and configuring system components (e.g., management systems and NQMs) with, multiple quorum schemes, rather than having a single quorum scheme defined for a whole system, in accordance with some embodiments of the invention. That is, multiple quorum schemes may be defined, and each quorum scheme associated with one or more objects. The scope or granularity of the objects associated with quorum schemes may vary. For example, quorum schemes may be associated with one or more higher-level objects like an entire storage array or associated with lower-level objects, like a logical volume, logical device and/or a group of data objects associated with a particular application or organization logic, or any other type of object.

A management system may be configured to be part of a quorum-eligibility group of an object based on any of a variety of factors, including, for example, any of: the number of management systems in the system, the quorum rule (e.g., majority) to be employed; whether one or more NQMs will be employed; whether an instance of the object is stored in a same fault domain (e.g., site) of at least one of the management systems that are members of the quorum scheme (i.e., members of the quorum-eligibility group of the quorum scheme); and the desire to maintain high availability of the object in response to various failure scenarios.

In some embodiments, an object exists (e.g., has an instance) in only a subset (e.g., one) of those fault domains. In such embodiments, a quorum-eligibility group may be defined (and one or more management systems of the system configured) such that a number of quorum-eligibility group members (e.g., management systems and optionally one or more NQMs) that reside in the subset of fault domains is greater than a total combined number of quorum-eligibility group members that reside in any other of the fault domains (i.e., that are not part of the subset).

For example, referring to FIG. 7, consider the first reference embodiment described above, in which: management systems 708 and 710 are configured to manage object 718 by managing object instance 718'; management systems 714 and 716 are configured to manage object 718 by managing object instance 718"; management systems 708 and 710 are configured to access and manage objects 720, 721 and 722; management systems 714 and 716 are configured to access (e.g., via network 700) object 720, but not to manage it; management systems 714 and 716 are configured to not access object 721; and the quorum rule is majority.

In such embodiments, for object 720, a quorum-eligibility group may be defined to include management systems 708 and 710 and NQM 712. Thus, a quorum may be established as long as one of management systems 708 or 710 is in operative communication with each other or NQM 712, and operative communications with management system 714 or 716 is not required.

In some embodiments, system 700 may be configured to include only a single management system (e.g., 708) in fault domain 702, in which case the quorum-eligibility group for object 720 may defined to include only management system 708.

Further, in embodiments of the invention, system 700 may include additional fault domains and/or management systems (not illustrated). For example, consider if there is a fourth fault domain including one or more management systems, but an instance of object 718 does not reside in the fourth fault domain, which will be referred to hereinafter as the "second reference embodiment." In such example, a quorum-eligibility group may be defined to include management systems 708, 710, 714, 716 and NQM 712, and associated with object 718 (and perhaps other objects). A quorum may be established for object 718 as long as three or more of 708, 710, 712, 714 and 716 are in operative communication with each other (three of the five members), and operative communications with any of the management systems and the fourth fault domain is not required.

Further, in some embodiments, a quorum-eligibility group to be associated with one or more objects may be defined (and one or more management systems, and potentially NQMs, of the system configured) to include an odd number of members. For example, referring to the first reference embodiment, a quorum-eligibility group of object 720 may be defined to include management systems 708, 710 and NQM 712 (total quorum-eligibility group members=three). Further, in embodiments in which there is only a single management system (e.g., 708) that resides in fault domain 702 or that is responsible for managing object 720 (i.e., there are other manage systems present—e.g., 710—but are not configured to manage it), the quorum-eligibility group to be associated with object 720 may defined to include only management system 708 (total quorum-eligibility group members=one).

In some embodiments, a quorum-eligibility group may be defined (and one or more management systems of the system configured) such that a same number of members of the quorum-eligibility group reside in each fault domain of such subset. For example, it may be desirable to employ such a same number in embodiments in which (as described above) one or more objects exists in only a subset of fault domains. In such embodiments, a quorum-eligibility group to be associated with such one or more objects may be defined such that a number of quorum-eligibility group members that reside in the subset of fault domains is greater than a total combined number of quorum-eligibility group members that reside in any other of the fault domains. For example, referring to FIG. 7, for the first or second reference embodiments described above, it may be desirable to define a quorum-eligibility group to be associated with object 718 (and perhaps other objects) that includes NQM 712, two management entities (e.g., 708 and 710) from fault domain 702 and two (714 and 716) from fault domain 706. Such a configuration would enable a quorum to be established for object 718 even in the event of a communication failure with all of fault domain 706 or all of fault domain 702.

In some embodiments of the invention, a quorum scheme associated (or to be associated) with one or more objects may be summarized as being defined by one or more of the following tenets:

1) quorum rule=majority;
2) number of quorum-eligibility group members is an odd number;
3) majority of quorum-eligibility group members reside in fault domains in which the one or more objects exist; and
4) same number of quorum-eligibility group members reside in each fault domain in which the one or more objects exist In some embodiments of the invention, rather than having three or more fault domains (e.g., 702, 704 and 706) as illustrated in FIG. 7, the system may include only two domains. For example, the third fault domain 704 and NQM 712 may be removed from the system, and an additional management system and/or non-management entity that could serve as an NQM placed within each fault domain 702 and 706. For an object (e.g., 720) that existed in only one of those fault domains (e.g., 702), a quorum-eligibility group could be defined to include all three management systems (or two management systems and the non-management entity—making it an NQM). If the quorum rule is defined to be majority, such a configuration would satisfy all of the tenets set forth above. For an object (e.g., 718) that exists in both fault domains (e.g., 702 and 706), a quorum-eligibility group could be defined to include an odd number of members drawn from each fault domain, for example, three of the components from fault domain 702 and two from 706, or vice versa. In either case, if the majority quorum rule is employed, the first three tenets above would be satisfied.

It should be appreciated that, for objects that exist in multiple fault domains (or for which management systems from multiple domains are management capable), less than all of the management-capable management systems of a given fault domain may be included in a quorum-eligibility group associated with the object in some embodiments of the invention. For example, in reference to the first reference embodiment described above, for object 718, a quorum-eligibility group may be defined to include management system 708, NQM 712 and management system 716, or management system 710, NQM 712 and management system 714. If the majority quorum rule is used, either configuration would satisfy the four tenets above.

More generally, it may be desirable to include less than all management-capable management systems in a quorum-eligibility group to increase the likelihood of maintaining high availability of one or more objects for certain failure scenarios. For example, consider an example in which, for a given object (e.g., a logical volume), there are five management-capable management systems (MCMSs) for the object in a first fault domain, three in a second fault domain, and an NQM in a third domain. If all five, or even four, of the MCMSs in the first fault domain were included in the quorum-eligibility group associated with the object, a quorum could not be established to manage the object if the first fault domain failed, resulting in down time for the object and any other object associated with the quorum-eligibility group. It should be appreciated that there may be additional fault domains with MCMSs for the object, in which case defining a quorum-eligibility group (to be associated with the object) to include the same or approximately the same number of management systems in each such fault domain may be desirable to maintain high availability, to increase the likelihood of establishing a quorum for the object in the event of a failure or a given fault domain or various communication failure scenarios between management systems of one or more fault domains.

It should be appreciated that, in some embodiments, a management system (e.g., any of those illustrated in system 700) may be designated as an NQM (e.g., like a Witness, even though it has management capabilities) for the purpose of establishing quorums for one or more objects. That is, a quorum scheme could be defined for one of more objects such that a management system is a quorum-eligibility group member, and can be used to determine a quorum, but would not be allowed to manage the one or more objects if it is determined to be part of the quorum; i.e., it could be used like an NQM.

Figure 8:
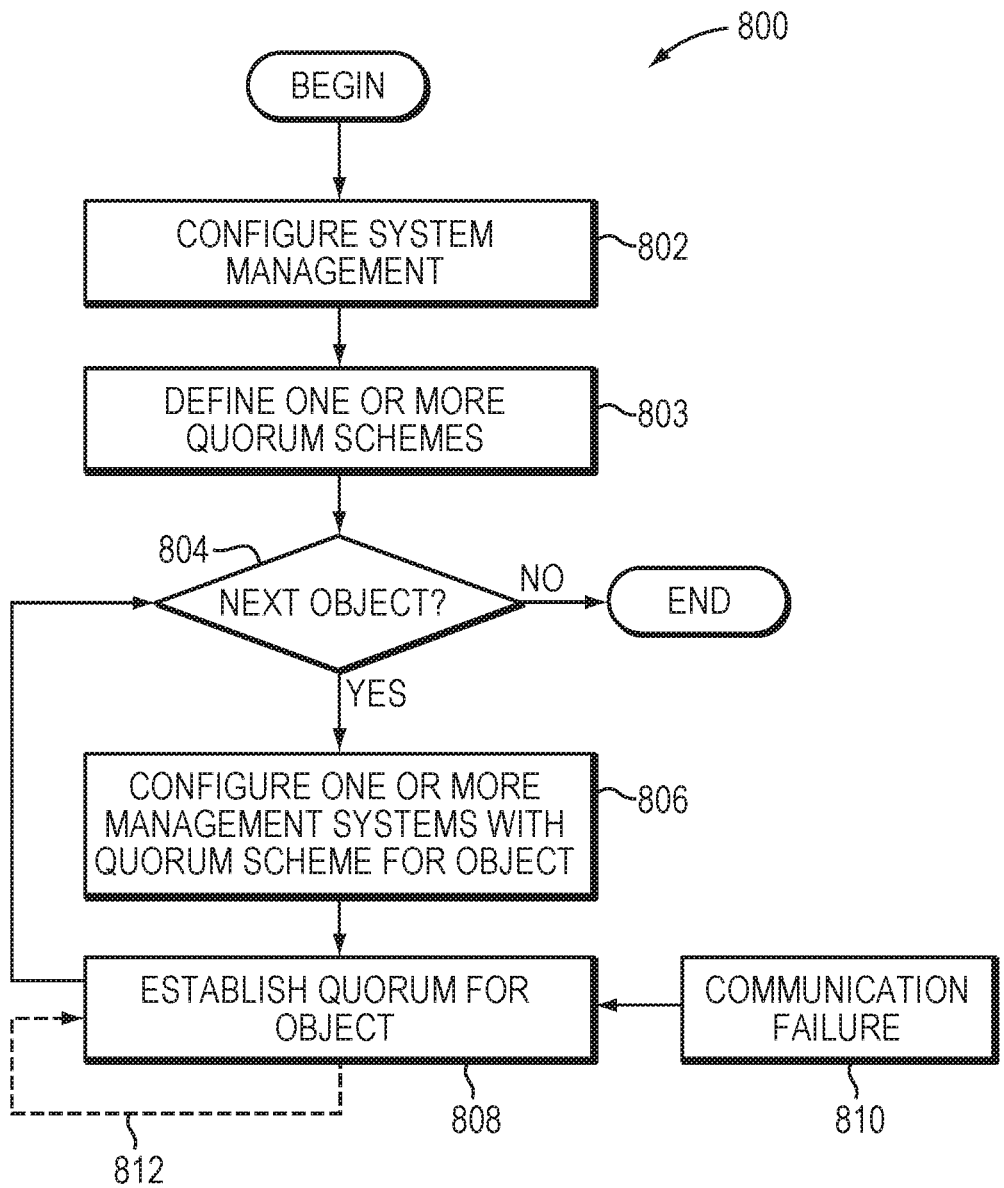
FIG. 8 is a flow chart illustrating a method of implementing object-specific quorum schemes in accordance with some embodiments of the invention.

FIG. 8 is a flow chart illustrating a method 800 of implementing object-specific quorum schemes in accordance with some embodiments of the invention. Method 800 is merely an illustrative embodiment of a method of object-specific quorum schemes, and is not intended to limit the scope of the invention. Any of numerous other implementations of object-specific quorum schemes, for example, variations of method 800, are possible and are intended to fall within the scope of the invention. Method 800 may be implemented using any of systems 50, 200, 200', 200" and/or 250 described above in relation to FIGS. 1-7, components thereof, or any suitable combination of the foregoing. In some embodiments of the invention, one or more of the acts of method 800, or portions thereof, are performed by a director (e.g., 20), or director cluster (e.g., 220a, 220b) of a VPLEX system, and/or one or more components of a ViPR system.

In act 802, system management may be configured. For example, the management scheme of the system may be designed, deployed and configured, resulting in one or more management systems (and potentially non-management systems to be used as NQMs) configured across one or more fault domains of the system, e.g., as described above in relation to any of systems 200, 200', 200," 250 or 700, or a suitable combination thereof.

In act 803, one or more quorum schemes may be defined. For example, one or more quorum scheme abstractions may be provided (e.g. created and/or modified) by a user (e.g., a system administrator), each quorum scheme abstraction defining a quorum scheme, including, for example, a quorum-eligibility group and/or a quorum rule (e.g., majority). The quorum-eligibility groups may be defined to include management systems in accordance with any of the embodiments described herein. Quorum scheme abstractions may be configured and stored as part of a data structure like that described below in more detail in relation to FIG. 9.

In other acts of method 800, one or more management systems may be configured to associate one or more objects with the quorum schemes defined in act 803. For example, in act 804, for a given management system, it may be determined whether there is another object for which to associate a quorum scheme. For example, the object may be any other objects or types of objects described herein, for example, any of objects 718, 720, 721 or 722 described above in relation to FIG. 7. If there is no other object, method 800 may end. Otherwise, method 800 may proceed to act 806.

In Act 806, one or more management systems may be configured with a quorum scheme for the object, for example, as described above in relation to FIG. 7. That is, the quorum scheme may be associated with the object on the management system. It should be appreciated that, in some embodiments, every management system and NQM in the system that has knowledge of an object is configured with the same quorum scheme for the object. Such configuration may ensure that quorums are properly and consistently determined between management systems, and split-brain scenarios are avoided. Such configuration may be achieved by sharing and exchanging quorum scheme information between management systems and NQMs, for example, by exchanging and/or having common access to the data structures described below in relation to FIGS. 9 and 10 or the information contained therein.

Configuring the one or more management systems may include maintaining one or more data structures on one or more management systems themselves and/or one or more data storage elements, for example, as one or more objects. Data structure 900 described below, which will now be described, may be used.

Figure 9:
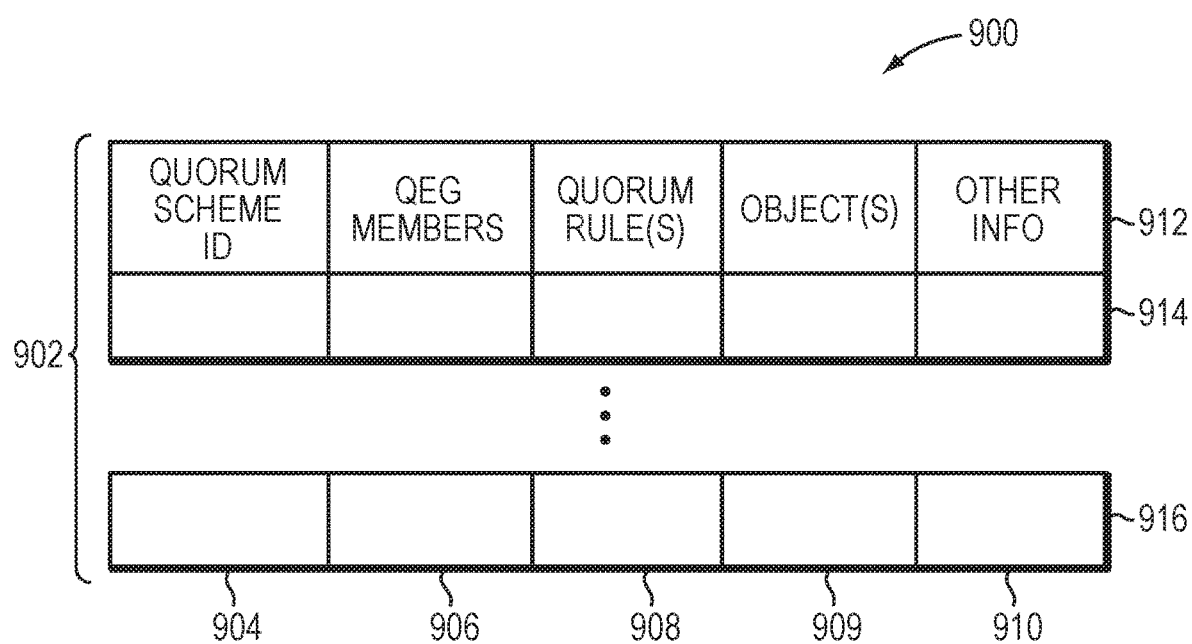
FIG. 9 illustrates an example of a data structure that may be used to manage quorum schemes for objects in accordance with some embodiments of the invention.

In some embodiments, data structures representing quorum schemes may be used, for example as illustrated in relation to FIG. 9. In such embodiments, the quorum scheme data structure may specify the information (quorum-eligibility group members, quorum rules, objects to which it applies, etc.) of the quorum scheme, and each entry 902 in data structure 900 may include a field that serves as an index to an entry in such data structure. In such embodiments, it may be desirable to not include the quorum scheme details for an object in an object-keyed data structure, for example, data structure 900, but rather rely on the details provided in the quorum scheme data structure, thus reducing redundant information storage.

FIG. 9 illustrates an example of a data structure 900 that may be used to manage quorum schemes for objects in accordance with some embodiments of the invention. Data structure 900 is merely an illustrative embodiment of a data structure that may be used to manage quorum schemes for an object, and is not intended to limit the scope of the invention. Any of numerous other implementations of a data structure, for example, variations of structure 900, are possible and are intended to fall within the scope of the invention. It should be appreciated by those of skill in the art that data structure 900 is merely illustrative, and typical implementations may be more complex.

Data structure 900 may include a plurality of entries 912-916, each entry corresponding to a particular quorum scheme of a system. Each entry 912-916 may include values for any of following fields: quorum scheme ID field 904, QEG members field 906, quorum rule(s) field 908, object(s) field 909 and other info field 910. Quorum scheme ID field 904 may specify a unique identifier (in the context of the system) of a quorum scheme represented by the entry. QEG members field 906 may specify the members (e.g., management systems and NQMs) of the quorum-eligibility group for the quorum scheme represented by the entry. Quorum rule(s) field 908 may specify the one or more quorum rules (e.g., majority) for the quorum scheme represented by the entry, and object(s) field 909 may specify the one or more objects with which the quorum scheme has been associated. Other info field 912 may specify other information that may be associated with the quorum scheme of the object represented by the entry. The quorum scheme represented by each entry may be any of those described herein. A data structure (e.g., 900) for an object of the system may have a quorum scheme field that serves as an index to an entry of a quorum scheme entry 902 of data structure 900.

In some embodiments of the invention, a same quorum rule (e.g., majority) may be applied to all quorum schemes. In such embodiments, a number of possible quorum schemes (and thus entries in a quorum scheme data structure) may be limited by the number of management systems and/or potential NQMs (e.g., a modified Witness) in the system. For example, the number of potential quorum schemes may be defined by $N=2^n-1$, where n is the combined number of management systems and potential NQMs, and N is the number of potential quorum schemes.

It should be appreciated that other arrangements of fields 904-910 are possible and are intended to fall within the scope of the invention. Further, data structure 900 may be a part of a larger data structure and/or include other data structures, and may itself be an object.

Figure 10:
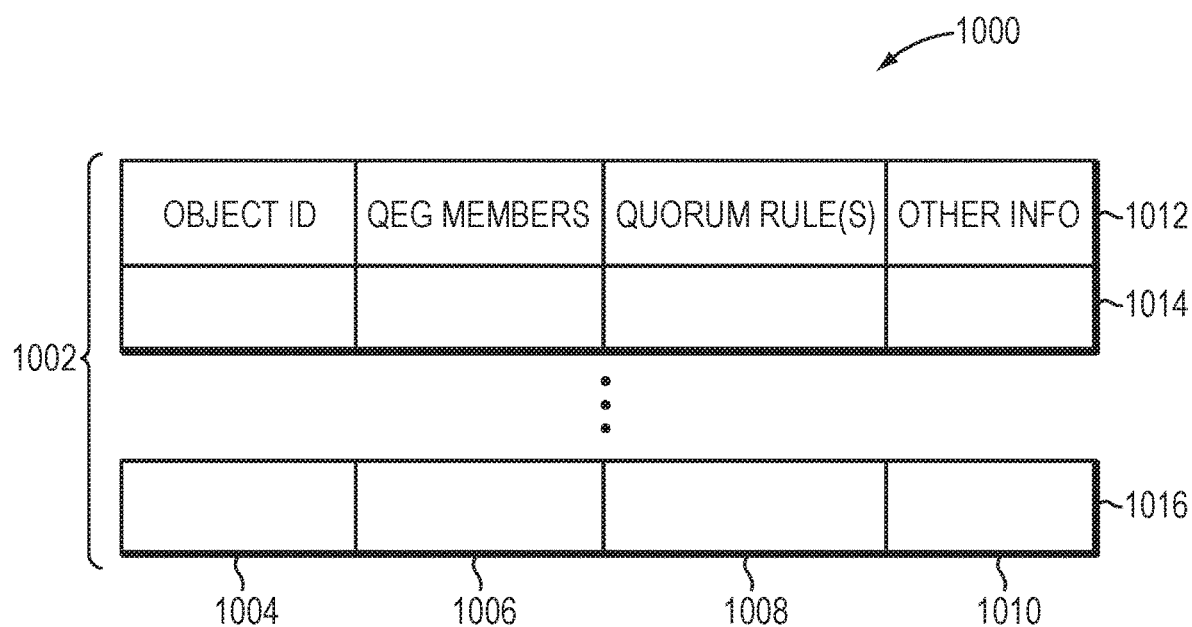
FIG. 10 illustrates an example of another data structure that may be used to manage quorum schemes for objects in accordance with some embodiments of the invention.

FIG. 10 illustrates an example of a data structure 1000 that may be used to manage quorum schemes for objects in accordance with some embodiments of the invention. Data structure 1000 is merely an illustrative embodiment of a data structure that may be used to manage quorum schemes for an object, and is not intended to limit the scope of the invention. Any of numerous other implementations of a data structure, for example, variations of structure 1000, are possible and are intended to fall within the scope of the invention. It should be appreciated by those of skill in the art that data structure 1000 is merely illustrative, and typical implementations may be more complex.

Data structure 1000 may include a plurality of entries 1012-1016, each entry corresponding to a particular object of a system, e.g., an object described above in relation to FIG. 7. Each entry 1012-1014 may include values for any of the following fields: object ID field 1004, QEG members field 1006, quorum rule(s) field 1008 and other info field 1010. Object ID field 1004 may specific a unique identifier (in the context of the system) of an object represented by the entry. QEG members field 1006 may specify the members of the quorum-eligibility group for the object represented by the entry. Quorum rule(s) field may specify the one or more quorum rules (e.g., majority) for the object represented by the entry, and other info field 1012 may specify other information that may be associated with the quorum scheme of the object represented by the entry. The quorum scheme represented by each entry may be any of these described herein.

It should be appreciated that other arrangements of fields 1004-1010 are possible and are intended to fall within the scope of the invention. Further, data structure 1000 may be a part of a larger data structure and/or include other data structures, and may itself be an object.

Returning to method 800, in act 806, a quorum may be established for the object, for example, as described above in relation to FIG. 7. For example, the quorum may be determined periodically (e.g., in accordance with a schedule, or the exchange of heart beeps between management systems) as indicated by arrow 812, or may be determined in response to a communication failure 814. For example, in response to detecting a communication failure, a management system (e.g., any of 708, 710, 714 and 716), and perhaps a non-management entity (e.g., a VPLEX Witness), may be configured to determine the quorum for the object. More generally, each management system may determine a quorum for each object for which the management system is a quorum member. It may do so by determining the other quorum members with which it is still in operative communications, and then determine whether such quorum members form a quorum according to the quorum rule, for example, a majority. Determining quorum members and the quorum rule for a member may include accessing one or more data structures (e.g., one or both of data structures 900 and 1000 described above). In some embodiments, a data structure for the object (e.g., 1000 or variant thereof) may be accessed to determine its quorum scheme (e.g., from a quorum ID field therein), and the identified quorum scheme may be used to access a quorum scheme data structure (e.g., 900) to determine the quorum-eligibility group members and quorum rule for the quorum scheme associated with the object.

If the management system determines that it is part of the quorum for a given object (during normal operation or in response to communication failure), it will start or continue (as the case may be) managing the object. If the management system determines that it is not part of the quorum, it will not manage the object, thereby avoiding a split-brain scenario. In some cases of a communication failure, the management system may not be allowed to manage an object for which it is a quorum-eligibility group member until the communication failure is rectified and the management system is again determined to be part of the quorum for the object.

In some embodiments, after determining the quorum for an object, the determined quorum may be stored or recorded (e.g., in a data structure, e.g., in memory) and referenced for all other objects having the same quorum scheme until the communication failure is resolved, thus obviating the need to recalculate the quorum for every object associated with the quorum scheme.

Acts 802-812 are illustrated as being performed serially for illustrative purposes, and it should be appreciated that the invention is not so limited. Two or more of the acts of method 800 may be performed in parallel and/or asynchronously to the performance of other acts of method 800. For example, acts 803, 806 and 808 may be performed concurrently by different management systems for the same or different quorum schemes and/or objects, and acts 806 and 808 may be performed for one or more objects of the system without being performed for other objects, for example, in response to user input. Further, act 802 may be performed asynchronously to any other acts, for example, in response to user input. Whenever act 802 is performed, it may be desirable to perform acts 803, 806 and 808 for each object to assure that quorum schemes are consistent with the overall system configuration.

Methods, and acts thereof, described herein, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein, and/or various embodiments, variations and combinations thereof. Such instructions may be written in any of a plurality of programming languages or scripts, for example, Java, J #, Visual Basic, C, C #, or C++, Perl, JavaScript, Fortran, Pascal, Eiffel, Basic, COBOL, Python, etc., or any of a variety of combinations thereof. The computer-readable media on which such instructions are embodied may reside on one or more of the components of any systems described herein, may be distributed across one or more of such components, and may be in transition there between.

The computer-readable media may be transportable such that the instructions stored thereon can be loaded onto any computer system object to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a system, for example, any of the systems described herein, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of an ordinal term such as "first", "second", "third", etc., in the claims to modify a claim element does not by itself connote any priority, precedence, or order of one claim element over another or the temporal order in which acts of a method are performed, but are used merely as reference labels to distinguish one claim element (in a same or different claims) having a certain name from another element having a same name (but for use of the ordinal term) to distinguish the claim elements. Use of an ordinal label other than "first" before a claim element does not mean that the invention recited in the claim necessarily includes at least one other element of the same name. For example, recitation of a "second" "item" in a claim does not mean that the invention recited in the claim necessarily includes a first "item." Only recitation of a "first" "item" in the same claim or a claim from which the claim depends would necessarily make such element a part of the recited invention.

What is claimed is:

1. For a system comprising a plurality of data storage objects residing in a plurality of fault domains, and a plurality of data storage management systems operative to manage the plurality of data storage objects, a first of the plurality of fault domains having a first data storage object and a second data storage object of the plurality of data storage objects resident therein, a method comprising acts of:
   identifying two or more data storage management systems that are providing coordinated management of the first and the second data storage objects and determining that a communication failure has occurred between the identified two or more data storage management systems, wherein the identified two or more data storage management systems attempt to manage the first and second data storage objects independently after the communication failure has occurred;
   providing a first quorum scheme having a first quorum-eligibility group of the plurality of data storage management systems eligible to manage one or more of the plurality of data storage objects;
   providing a second quorum scheme having a second quorum-eligibility group, different from the first quorum-eligibility group, of the plurality of data storage management systems eligible to manage one or more of the plurality of data storage objects;
   configuring at least a first of the plurality of data storage management systems to associate the first quorum scheme with the first data storage object; and
   configuring the at least first data storage management system to associate the second quorum scheme with the second data storage object.

2. The method of claim 1, wherein providing the first quorum scheme comprises defining the first quorum-eligibility group to exclude the first data storage management system.

3. The method of claim 1, wherein providing the first quorum scheme comprises defining the first quorum-eligibility group to include the first data storage management system.

4. The method of claim 1, wherein the at least first data storage management system has access and capability to manage the first data storage object, and wherein providing the second quorum scheme comprises defining the first quorum-eligibility group to exclude the first data storage management system.

5. The method of claim 1, further comprising:
   determining a first quorum for the first data storage object based on the first quorum scheme; and determining a second quorum for the second data storage object based on the second quorum scheme.

6. The method of claim 5, wherein the acts of determining the first quorum and determining the second quorum are performed in response to a communication failure in the system.

7. The method of claim 1, wherein the first data storage object exists in each of a first subset of the plurality of fault domains, and
   wherein providing the first quorum scheme comprises defining the first quorum scheme such that a majority of members of the first quorum-eligibility group reside in the first subset of the plurality of fault domains.

8. The method of claim 7, wherein providing the first quorum scheme comprises configuring the first quorum-eligibility group for the first data storage object such that a same number of members of the first quorum-eligibility group reside in each fault domain of the first subset.

9. The method of claim 7, wherein the first subset comprises only the first fault domain,
   wherein providing the first quorum scheme comprises defining the first quorum-eligibility group to include an odd number of members.

10. The method of claim 7, wherein the first quorum-eligibility group includes a non-managing quorum eligibility member.

11. The method of claim 7, wherein the first fault domain is a first site, and the second fault domain is a second site separate from the first site.

12. The method of claim 1, further comprising: enabling management of one or more of the plurality data storage objects by one or more of the plurality of data storage management systems in the event of a communication failure in the system while avoiding a split brain scenario.

13. A system comprising:
   a plurality of data storage objects residing in a plurality of fault domains, a first of the plurality of fault domains having a first data storage object and a second data storage object of the plurality of data storage objects resident therein;
   a plurality of data storage management systems operative to manage the plurality of data storage objects;
   two or more data storage management systems operative to coordinate management of the first and second data storage objects and determine that a communication failure has occurred between the identified two or more data storage management systems, wherein the identified two or more data storage management systems attempt to manage the first and second data storage objects independently after the communication failure has occurred;
   a first quorum scheme having a first quorum-eligibility group of the plurality of data storage management systems eligible to manage one or more of the plurality of data storage objects; and
   a second quorum scheme having a second quorum-eligibility group, different from the first quorum-eligibility group, of the plurality of data storage management systems eligible to manage one or more of the plurality of data storage objects, wherein at least a first of the plurality of data storage management systems is operative to: associate the first quorum scheme with the first data storage object; and associate the second quorum scheme with the second data storage object.

14. The system of claim 13, wherein the at least first data storage management system resides in a second fault domain that does not include an instance of the first data storage object.

15. The system of claim 14, wherein the first quorum scheme defines the first quorum-eligibility group to exclude the first data storage management system.

16. The system of claim 13, wherein the at least first data storage management system has access and capability to manage the first data storage object, and
wherein the second quorum scheme defines the first quorum-eligibility group to exclude the first data storage management system.

17. The system of claim 13, wherein the first data storage object exists in each of a first subset of the plurality of fault domains, and
wherein the first quorum scheme defines the first quorum scheme such that a majority of members of the first quorum-eligibility group reside in the first subset of the plurality of fault domains.

18. The system of claim 17, wherein the first subset comprises only the first fault domain, and
wherein the first quorum scheme defines the first quorum-eligibility group to include an odd number of members.

19. The system of claim 17, wherein the first fault domain is a first site, and the second fault domain is a second site separate from the first site.

20. A non-transitory computer-readable medium encoded with computer-executable instructions that, as a result of being executed by a computer, control the computer to perform, for a system comprising a plurality of data storage objects residing in a plurality of fault domains, and a plurality of data storage management systems operative to manage the plurality of data storage objects, a first of the plurality of fault domains having a first data storage object and a second data storage object of the plurality of data storage objects resident therein, a method comprising acts of:

identifying two or more data storage management systems that are providing coordinated management of the first and second data storage objects and determining that a communication failure has occurred between the identified two or more data storage management systems, wherein the identified two or more data storage management systems attempt to manage the first and the second data storage objects independently after the communication failure has occurred;

providing a first quorum scheme having a first quorum-eligibility group of the plurality of data storage management systems eligible to manage one or more of the plurality of data storage objects;

providing a second quorum scheme having a second quorum-eligibility group, different from the first quorum-eligibility group, of the plurality of data storage management systems eligible to manage one or more of the plurality of data storage objects;

configuring at least a first of the plurality of data storage management systems to associate the first quorum scheme with the first data storage object; and configuring the at least first data storage management system to associate the second quorum scheme with the second data storage object.

* * * * *